US005342031A

United States Patent [19]

Yu-Fang

[11] Patent Number: 5,342,031

[45] Date of Patent: Aug. 30, 1994

[54] HAND-SCREWED CLAMP FIXTURE WITH MULTI-DIRECTIONAL OPENING

[76] Inventor: Ai Yu-Fang, 3F, No. 8, Lane 261, Fu Yuan St., Taipei, Taiwan

[21] Appl. No.: 140,529

[22] Filed: Oct. 25, 1993

[51] Int. Cl.$^5$ ............ B23Q 3/02

[52] U.S. Cl. ............ 269/134; 269/147; 269/155; 269/221; 269/287; 269/113

[58] Field of Search ............ 269/134, 147-149, 269/155, 228, 287, 256, 156, 219, 221, 111, 118, 119

[56] References Cited

U.S. PATENT DOCUMENTS

| | | | |
|---|---|---|---|
| 3,024,521 | 3/1962 | Polk | 269/219 |
| 4,552,345 | 11/1985 | Benda et al. | 269/113 |
| 4,671,500 | 6/1987 | Mark | 269/155 |
| 5,058,870 | 10/1991 | Cetnar | 269/155 |
| 5,192,060 | 3/1993 | Novak | 269/155 |

*Primary Examiner*—Robert C. Watson
*Attorney, Agent, or Firm*—Bacon & Thomas

[57] ABSTRACT

A clamp fixture with multi-directional opening mainly comprises a front clamping head, a rear clamping base, a top pressing plate, a bottom pressing plate and two lock clamping bases. The front clamping head consists of two side plates which are riveted together by a lower stud shaft and a central stud shaft. The central shaft has a bolt, the front portion of which has a pushing block, and the rear end of the bolt has a wing nut connected thereto. Moreover, the rear clamping base also consists two side plates to cooperate with a lower stud shaft. The central stud shaft is inserted with an inverted U-shaped blocking base for holding the objects to be clamped. In addition, the upper and the bottom pressing plates are designed to have appropriate thickness. The two lock clamping bases are respectively installed on top of the front clamping head and the rear clamping base. Each of the lock clamping bases is made up of a bracket, a stud shaft, a screw bolt with a holding block. By such configuration, the lock clamping base is used for the top pressing plate to feed through and secured thereof. The bottom pressing plate is then fed through the front clamping head and the lower portion of the rear clamping base to cooperate with the bolt of the front clamping head for clamping and positioning the working objects.

1 Claim, 5 Drawing Sheets

HAND-SCREWED CLAMP FIXTURE WITH MULTI-DIRECTIONAL OPENING

BACKGROUND OF THE INVENTION (a) Field of the Invention

The present invention relates to a an adjustable clamp fixture with multi-directional opening, particularly to a clamp fixture having a front clamping head, a rear clamping base, a lock clamping base to hold a top pressing plate and a bottom pressing plate together for clamping an object together for metalworking, woodworking or any other similar type of work.

(b) Description of the Prior Art

Clamp fixtures used in woodworking are generally consists of several clamps to clamp the object wood panels together. Each of the clamps can only provide the clamping to one side of the object. Therefore, several clamps have to be used together to clamp the object properly and prevent an uneven finish. This is especially true to clamp the extended size objects together. Too many clamps drive up the tooling cost and make it inconvenient to operate.

SUMMARY OF THE INVENTION

The main object according to the present invention is to provide a design for a multi-directional-opening clamp fixture which is made up of a front clamping head, a rear clamping base together with a top pressing plate and a bottom pressing plate. The front clamping head and the rear clamping base are respectively provided with a lock clamping base so that the overall fixture is simple to operate. The fixture provides a solid grip to the left and right sides as well as the up and down sides of the work when needed, making the clamping secure and solid without any concern of loose grip.

A secondary object according to the present invention is to provide a design of a clamp fixture with multi-directional opening which is particularly simple and compact, which has a top pressing plate and a bottom pressing plate that are ready to be detached when they are not being used so that the clamp fixture will not occupy a lot of storage space.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
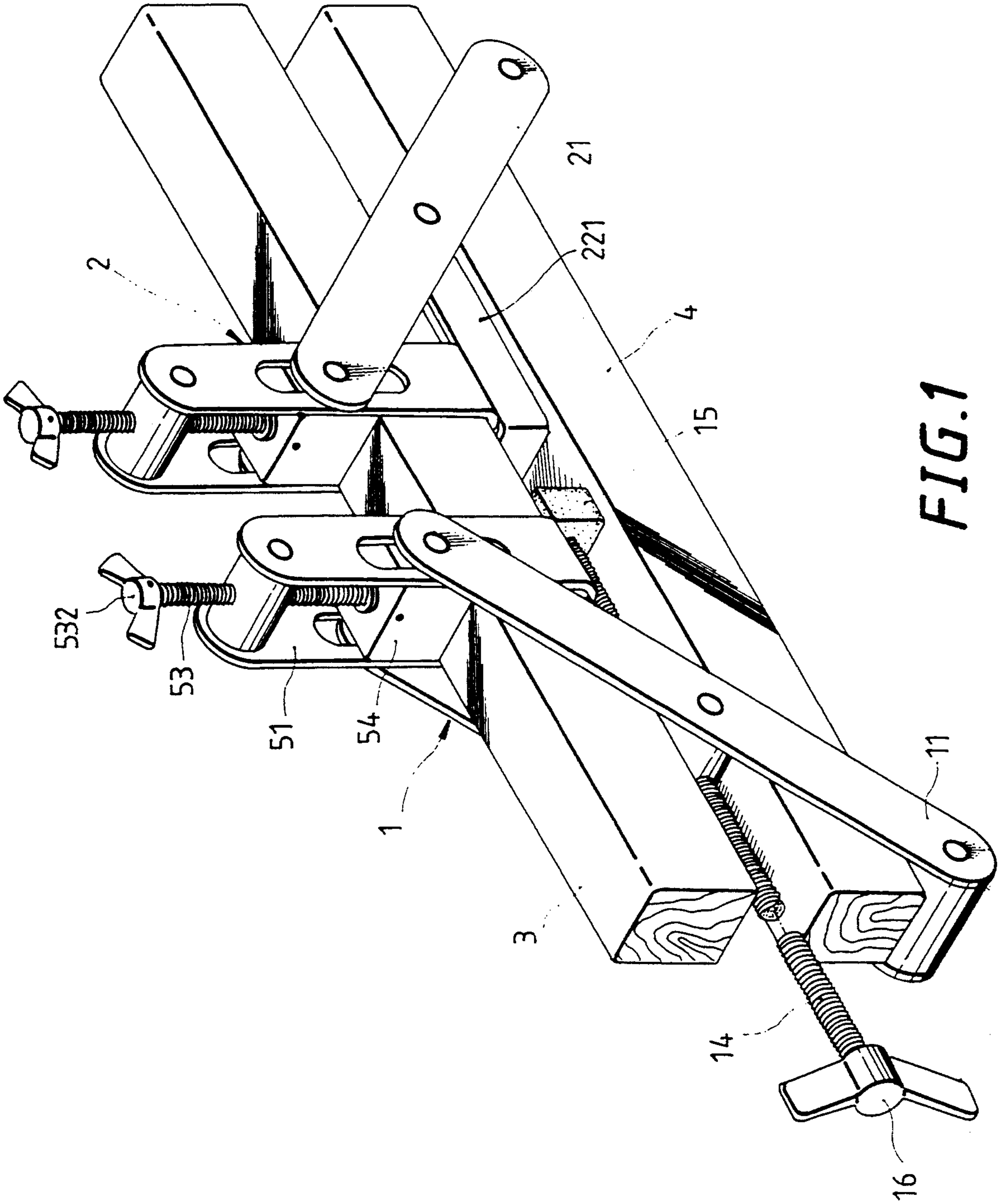
FIG. 1 is a perspective view of an assembly according to the present invention.
Figure 2:
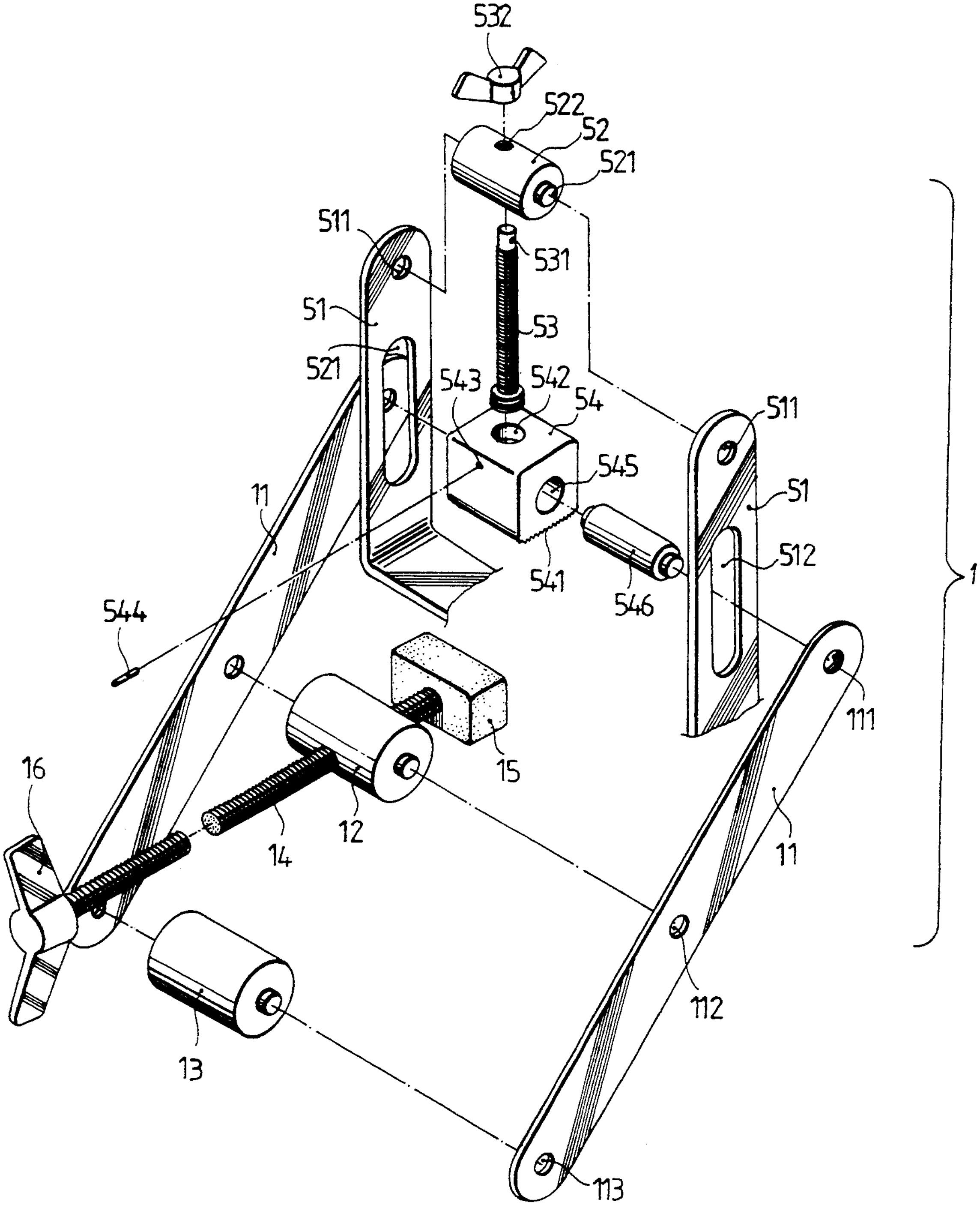
FIG. 2 is a perspective fragmented view of the front clamping head of the multi-directional clamping fixture according to the present invention.
Figure 3:
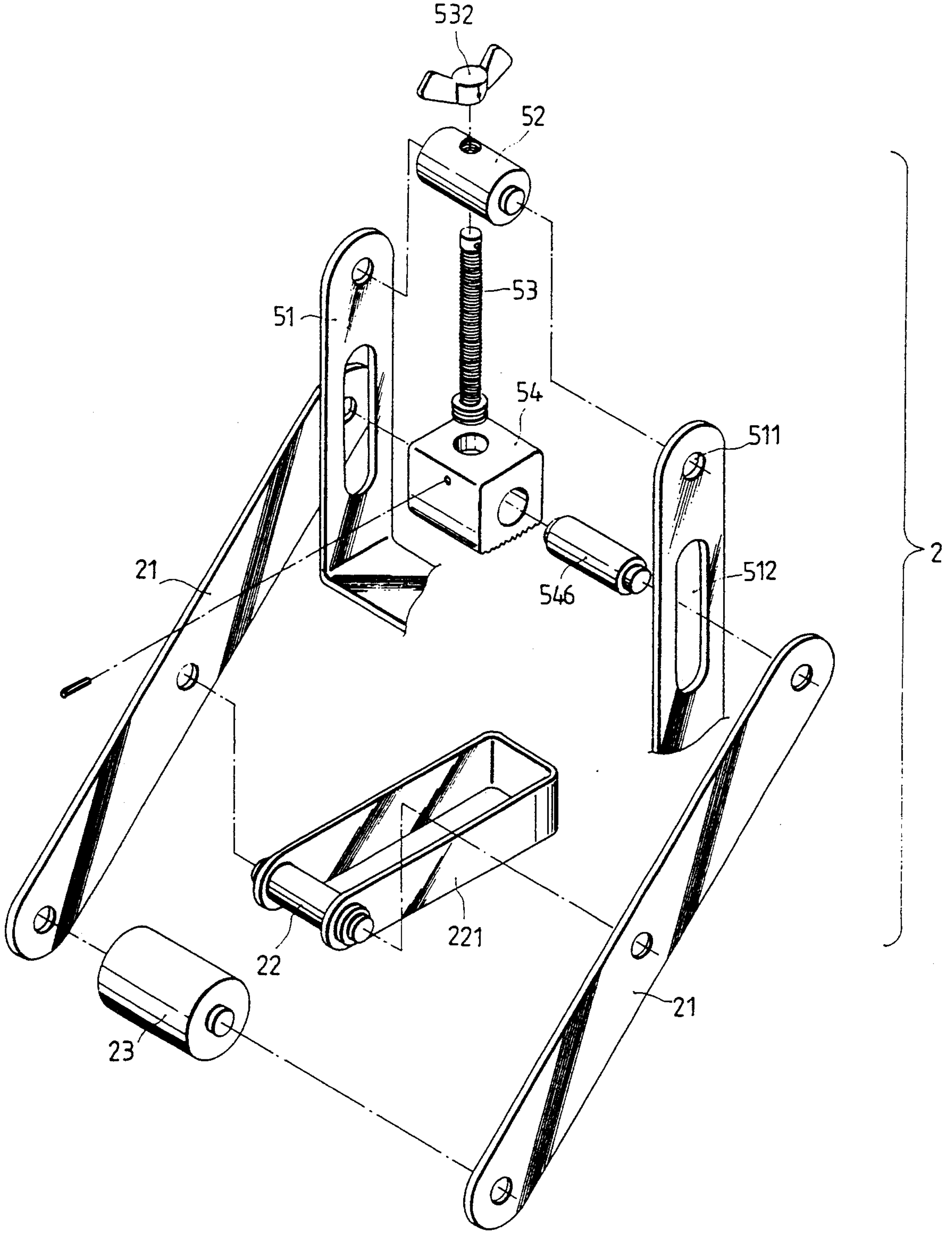
FIG. 3 is a perspective fragmented view of an assembly of the rear clamping base according to the present invention.

As shown in FIG. 1, the structure according to the present invention mainly consists of a front clamping head 1, a rear clamping base 2, a top pressing plate 3, a bottom pressing plate 4 and a pair of lock clamping base 5. The front clamping head 1 is shown in FIG. 2. It is mainly made up of two side plates 11 which are substantially flat and long. Each of the side plates 11 has three holes 111, 112 and 113 which are provided at both ends and at the center thereof. These three holes are respectively provided for the insertion and riveting of the stud shaft 52 of the lock clamping base 5, the central stud shaft 12 and a lower stud shaft 13. The central stud shaft 12 is provided with a screw hole for a bolt 14 to screw in. The front end of the bolt 14 has a pushing block 15 for pushing against the objects to be clamped. The rear end of the bolt 14 has a wing nut 16 which is an integral part of the bolt 14. When the wing nut 16 is turned to rotate, it can either screw the bolt 14 into or out of the screw hole of the central stud shaft 12, thereby clamping the objects securely or releasing the objects for removal. The rear clamping base 2 is shown in FIG. 3. The components to make up the rear clamping base 2 is similar to that of the front clamping head 1. The rear clamping base 2 also consists of two side plates 21, which are provided for the positioning of a stud shaft 52 of the lock clamping base 5, a central stud shaft 22 and a lower stud shaft 23. The central stud shaft 22 is inserted with an inverted U-shaped blocking base 221 for holding the objects to be clamped. The top pressing plate 3 is designed to have an appropriate thickness. The width of the top pressing plate 3 is made to fit into the front clamping head 1 and the rear clamping base 2. The overall length of the top pressing plate 3 is set to equal to the width of the objects 5 to be clamped. The bottom pressing plate is quite similar to the top pressing plate 3 and is designed to have an appropriate width. The width of the bottom pressing plate 4 is also made to fit into the front clamping head 1 and the rear clamping base 2. The overall length of the bottom pressing plate 4 is identical to that of the top pressing plate 3.

Referring to FIGS. 2 and 3, the two lock clamping bases 5 are respectively installed on top of the front clamping head 1 and on top of the rear clamping base 2. Each of the lock clamping bases 5 is made up of a bracket 51, a stud shaft 52, a screw bolt 53 and a holding block 54. The bracket 51 is formed to have a "U" shape with a pivotal connecting hole 511 on each side of its two side walls. The central portions of the side plates are provided with adjustment slots 512. The stud shaft 52, having a protruded member 521 at each end, is made to squeeze and secure into the pivotal connecting holes 511 of the bracket 51. The stud shaft 52 is provided with a screw hole 522 which is used for the screw bolt 53 to feed through. One end of the screw bolt 53 has a cotter-pin hole 531 for securing a wing nut 532 in place. The holding block 54 is designed to have an appropriate size and shape. The bottom of the holding block 54 is a flat rough surface 541. The top of the holding block 54 is provided with a positioning hole 542 for the insertion of the screw bolt 53. One side of the holding block 54 is provided with a cotter-pin hole 543 for accommodating a cotter pin 544. Moreover, the holding block 54 is also provided with a feed-through hole 545 in the lateral direction. The feed-through hole 545 is designed to allow the insertion of a movable shaft 546. The two ends of the movable shaft 546 also fed through the adjustment slots 512 of the bracket 51. Thus, the movable shaft 546 is movably mounted on the holes 111 located at the front of the two side plates 11 of the front clamping head 1.

Figure 4:
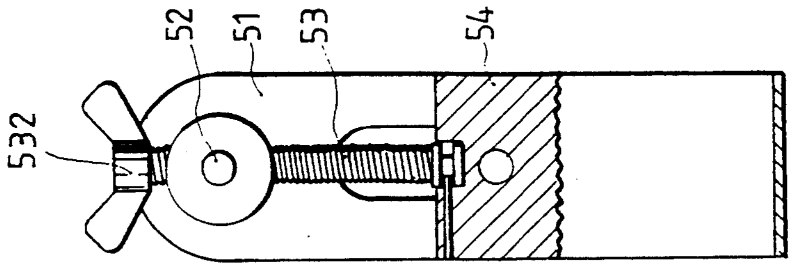
FIG. 4 is a cross-sectional view of an assembly of the lock clamping base according to the present invention.
Figure 5:
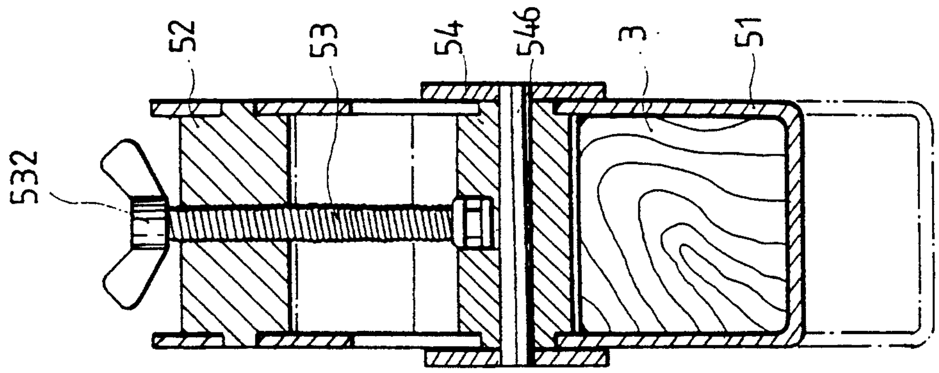
FIG. 5 is a diagrammatic view showing the interlocking of the lock clamping base and the top pressing plate according to the present invention.
Figure 6:
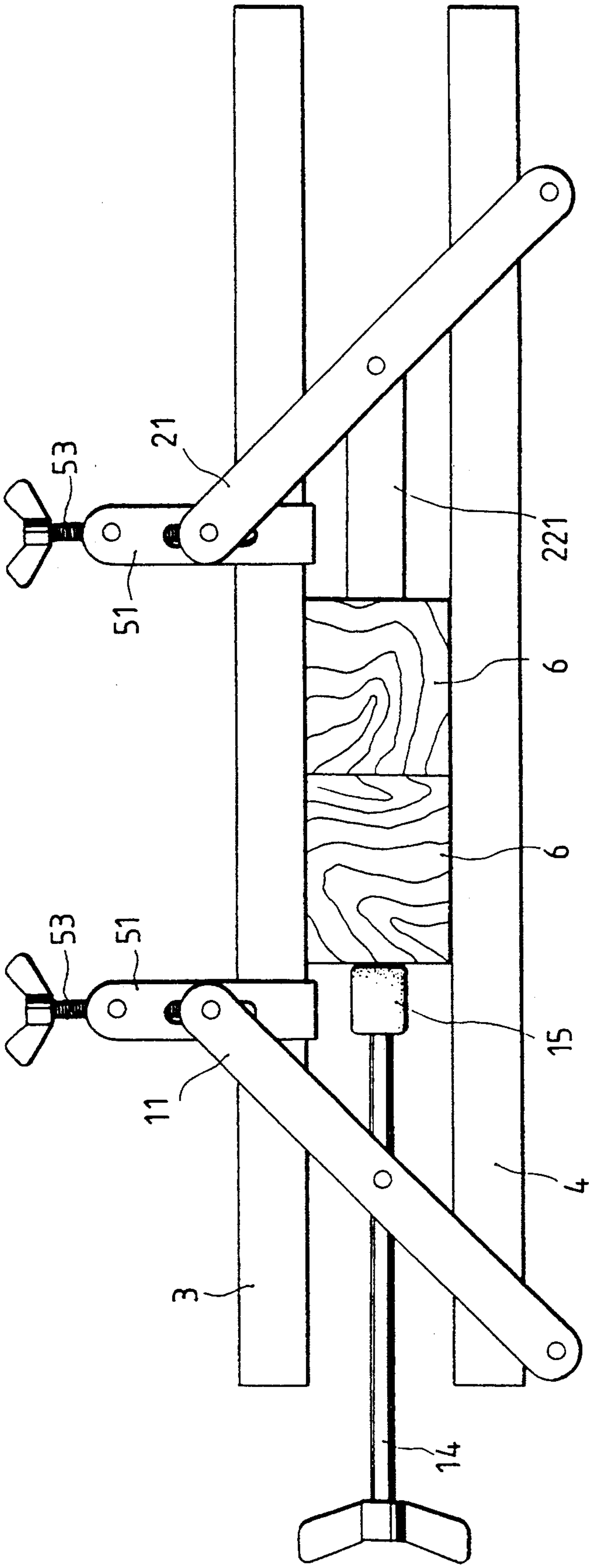
FIG. 6 is a diagrammatic view of an embodiment according to the present invention.

Referring to FIG. 4, the lock clamping base as configured by using the above components mainly is used for the top pressing plate 3 to feed through. The screw bolt 53 is turned so that the holding block 54 is secured and positioned, as shown in FIG. 5. The bottom of the rear clamping base 2 can also fed through with the bottom pressing plate 4. By such configuration, the front clamping head 1 cooperates with the rear clamping base 2 to form a clamp fixture which functions to clamp the working objects 6 together. The bolt 14 on the front clamping head 1 can be turned to adjust the tightening on the clamping of the working objects 6, as is shown in FIG. 6.

The structure according to the present invention eliminates the need for a fixed base and the adjustment thereof. In addition, the top pressing plate 3 and the bottom pressing plate 4 can be pulled out when they are not needed. The components are easy to assemble and disassemble and they occupy a very minimum space. The lock clamping base 3 can securely clamp the top pressing plate 3 in place without any concern of getting a loose clamping.

What is claimed is:

1. A hand-screwed clamp fixture with multi-directional opening mainly comprises:

a front clamping head;

a rear clamping base;

a top pressing plate;

a bottom pressing plate; and two lock clamping bases;

wherein the front clamping head is mainly made up of two side plates which are substantially flat and long, each of the side plates has three holes which are provided at both ends and at the center of the side plates, these three holes are respectively provided for the insertion and riveting of the stud shaft of the lock clamping base, the central stud shaft and the lower stud shaft while the central stud shaft is provided with a screw hole for a bolt to screw in, the front end of the bolt has a pushing block, the rear end of the bolt has a wing nut which is an integral part of the bolt and when the wing nut is turned to rotate, it can either screw the bolt into or out of the screw hole of the central stud shaft;

said rear clamping base is similar to the front clamping head, it also consists of two side plates, which are provided for the positioning of three stud shafts: a stud shaft of the lock clamping base, a central stud shaft and a lower stud shaft, the central stud shaft is inserted with an inverted U-shaped blocking base for holding the objects to be clamped;

said top pressing plate is designed to have an appropriate thickness, the width of the top pressing plate is made to fit into the front clamping head and the rear clamping base;

said bottom pressing plate is quite similar to the top pressing plate and is designed to have an appropriate width, the width of the bottom pressing plate is also made to fit into the front clamping head and the rear clamping base;

each of the two lock clamping bases is made up of a bracket, a stud shaft, a screw bolt and a holding block wherein:

the bracket is formed into a "U" shape having a pivotal connecting hole on each side of its two side walls, the central portions of the side plates are provided with adjustment slots;

the stud shaft, having a protruded member at each end, is made to squeeze and secure into the pivotal connecting holes of the bracket, the stud shaft is provided with a screw hole which is used for the screw bolt to feed through, one end of the screw bolt has a cotter-pin hole for securing a wing nut in place;

said holding block is designed to have an appropriate size and shape, the bottom of the holding block is a flat and rough surface, the top of the holding block is provided with a positioning hole for the insertion of the screw bolt, one side of the holding block is provided with a cotter-pin hole for accommodating a cotter pin, moreover, the holding block is also provided with a feed-through hole in the lateral direction, the feed-through hole is designed to allow the insertion of a movable shaft, the two ends of the movable shaft also fed through the adjustment slots of the bracket, thereby the movable shaft is movably mounted on the holes located at the front of the two side plates of the front clamping head.

* * * * *